(12) United States Patent
Asanuma et al.

(10) Patent No.: US 11,858,622 B2
(45) Date of Patent: Jan. 2, 2024

(54) AIRCRAFT

(71) Applicant: HONDA MOTOR CO., LTD., Tokyo (JP)

(72) Inventors: Masahiko Asanuma, Wako (JP); Susumu Mashio, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 8 days.

(21) Appl. No.: 17/694,749

(22) Filed: Mar. 15, 2022

(65) Prior Publication Data

US 2022/0306291 A1    Sep. 29, 2022

(30) Foreign Application Priority Data

Mar. 25, 2021 (JP) ................. 2021-050899

(51) Int. Cl.
  *B64C 29/00* (2006.01)
  *B64C 7/00* (2006.01)

(52) U.S. Cl.
  CPC ............ *B64C 29/0025* (2013.01); *B64C 7/00* (2013.01)

(58) Field of Classification Search
  CPC ............ B64C 29/0008; B64C 29/0016; B64C 29/0025; B64U 10/20; B64U 30/29
  See application file for complete search history.

(56) References Cited

U.S. PATENT DOCUMENTS

| 9,120,560 B1 | 9/2015 | Armer et al. |
| 2018/0186445 A1* | 7/2018 | Fenny ................... B64D 31/00 |
| 2019/0135425 A1* | 5/2019 | Moore ................ B64C 29/0033 |

* cited by examiner

*Primary Examiner* — Nicholas McFall
(74) *Attorney, Agent, or Firm* — Amin, Turocy & Watson, LLP

(57) ABSTRACT

The cross-sectional shape of a support member is an airfoil shape in which a first end portion including a first end is curved and which tapers toward a second end. The support member is arranged such that the tapering direction of the airfoil shape is downward, and the tapering direction of the support member is determined in advance according to the moving direction of a blade passing directly above the support member during rotation of a takeoff and landing rotor.

7 Claims, 6 Drawing Sheets

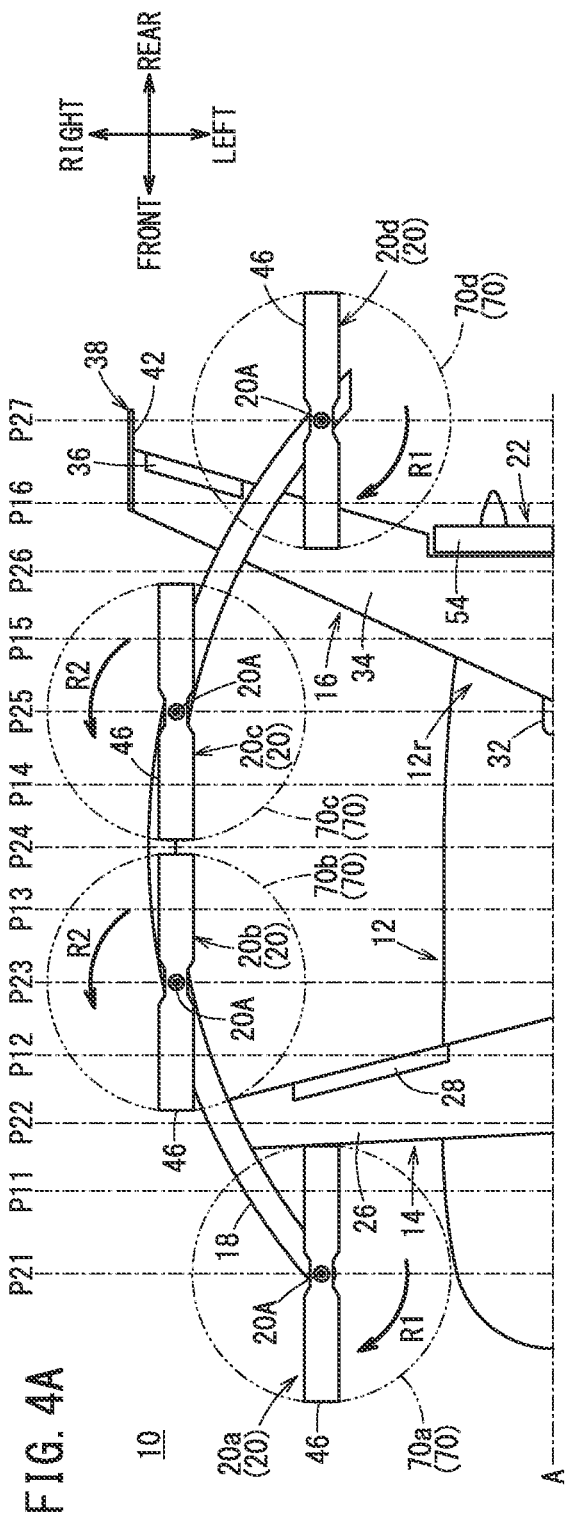
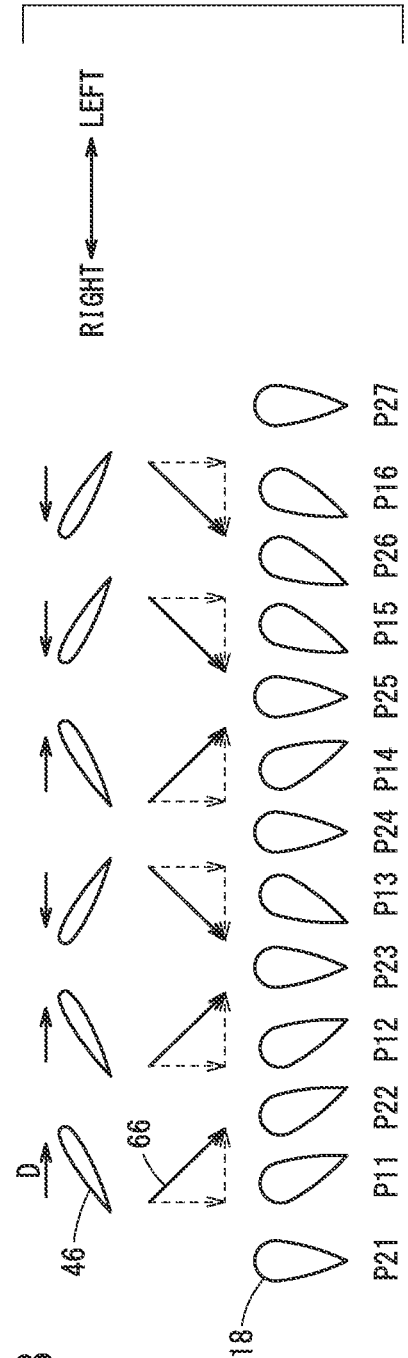
FIG. 4A
FIG. 4B

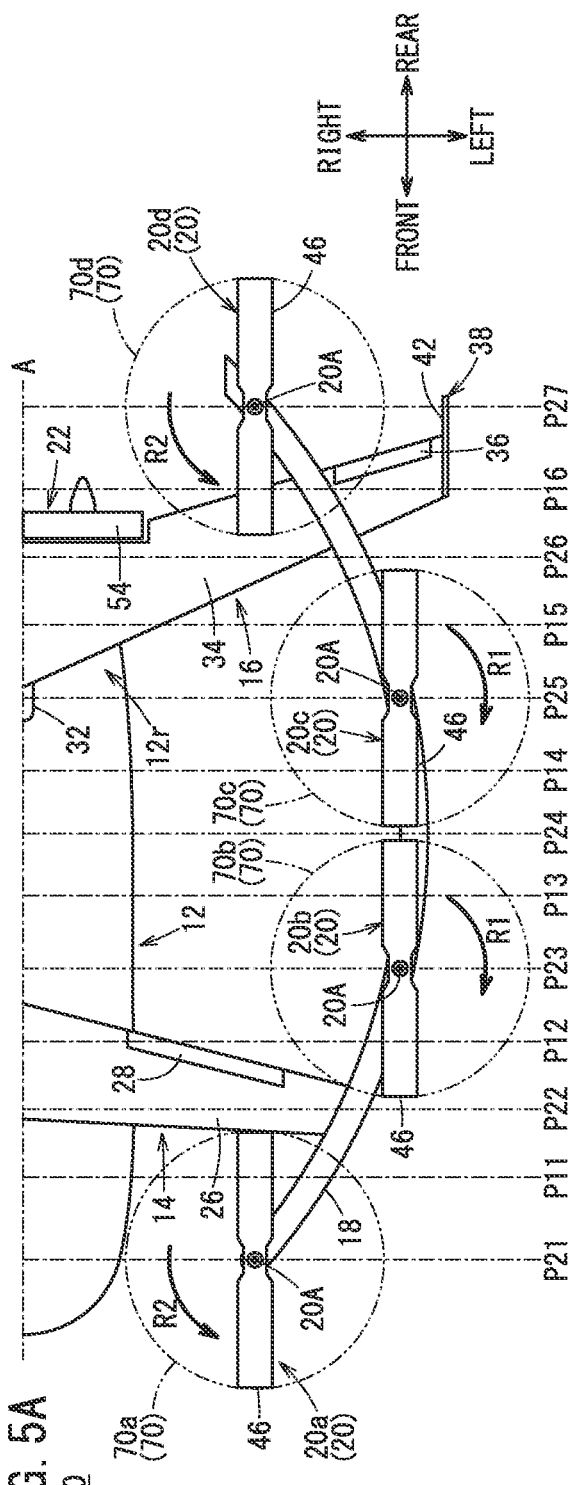
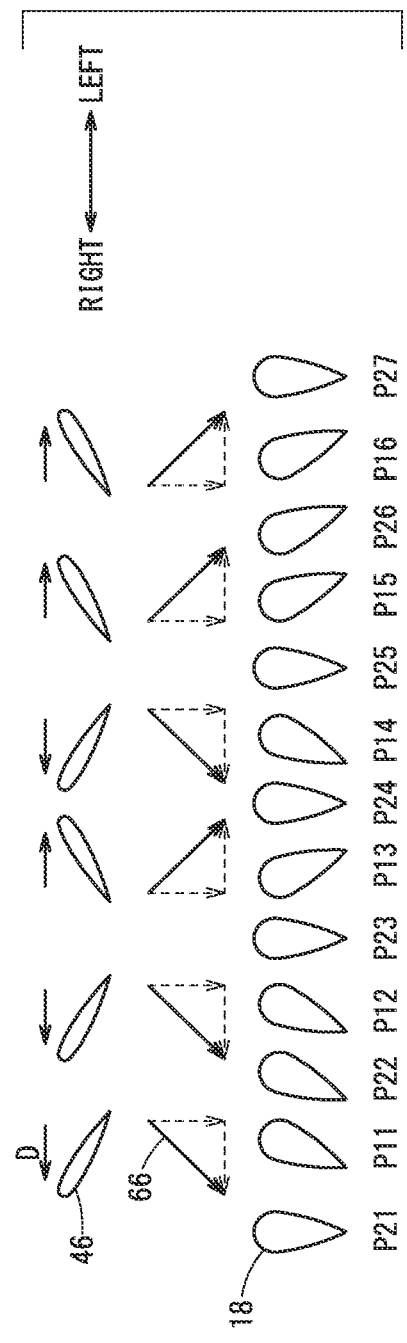
FIG. 5A
FIG. 5B

AIRCRAFT

CROSS-REFERENCE TO RELATED APPLICATIONS

This application is based upon and claims the benefit of priority from Japanese Patent Application No. 2021-050899 filed on Mar. 25, 2021, the contents of which are incorporated herein by reference.

BACKGROUND OF THE INVENTION

Field of the Invention

The present invention relates to an aircraft using a rotor during vertical takeoff and landing.

Description of the Related Art

U.S. Pat. No. 9,120,560 B1 discloses a vertical take-off and landing (VTOL) drone as an aircraft. The aircraft includes four takeoff and landing rotors and a cruise rotor. Each of the four takeoff and landing rotors is located on the left or right side of the fuselage. The cruise rotor is disposed at a rear end of the fuselage. The aircraft also includes so-called booms. The booms are bar-shaped support members. The booms extend in the front-rear direction on the left and right sides of the fuselage. The right boom extends in the front-rear direction from the right wing. The right boom supports two takeoff and landing rotors from below. The left boom extends in the front-rear direction from the left wing. The left boom supports two takeoff and landing rotors from below. The boom needs to have a certain thickness in order to house various parts and increase the rigidity of the wings.

SUMMARY OF THE INVENTION

When the takeoff and landing rotors rotate, a downwash occurs below the takeoff and landing rotors. If the boom is thick, the area of the portion thereof disposed below the rotor disc area increases. For this reason, the influence of downwash on the boom is increased. If the cross-sectional shape of the boom is a streamlined shape, for example, an airfoil shape, the influence of downwash on the boom is reduced. However, if the cross-sectional shape of the boom is simply streamlined, an air pressure difference occurs between the left and right sides of the cross section of the boom. Then, a force in the lateral direction (yawing direction) may be generated on the boom. When this force becomes large, there is a possibility that rolling occurs at the time of vertical takeoff and landing and at the time of hovering of the aircraft.

An object of the present invention is to solve the aforementioned problem.

According to an aspect of the present invention, provided is an aircraft comprising: a fuselage; a takeoff and landing rotor including a blade and configured to generate lift when the aircraft moves in a vertical direction; and a support member having a bar shape, connected to the fuselage directly or via another member, and configured to support the takeoff and landing rotor below the blade, wherein a cross-sectional shape of the support member is an airfoil shape in which a first end portion including a first end is curved and which tapers toward a second end, the support member is disposed in a manner that a tapering direction of the airfoil shape is downward, and the tapering direction of the support member is determined in advance according to a moving direction of the blade passing directly above the support member during rotation of the takeoff and landing rotor.

According to the present invention, it is possible to suppress a force generated on the support member (boom) accompanying the rotation of the takeoff and landing rotor.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4A is a diagram showing a plurality of positions between the front end of a right boom and the rear end of the right boom;

FIG. 4B is a diagram showing, at each position, the direction in which the blade moves, the direction of the airflow, and the direction in which the boom tapers;

FIG. 5A is a diagram showing a plurality of positions between the front end of a left boom and the rear end of the left boom;

FIG. 5B is a diagram showing, at each position, the direction in which the blade moves, the direction of the airflow, and the direction in which the boom tapers;

DESCRIPTION OF THE INVENTION

[1. Overall Configuration of Aircraft 10]

Figure 1:
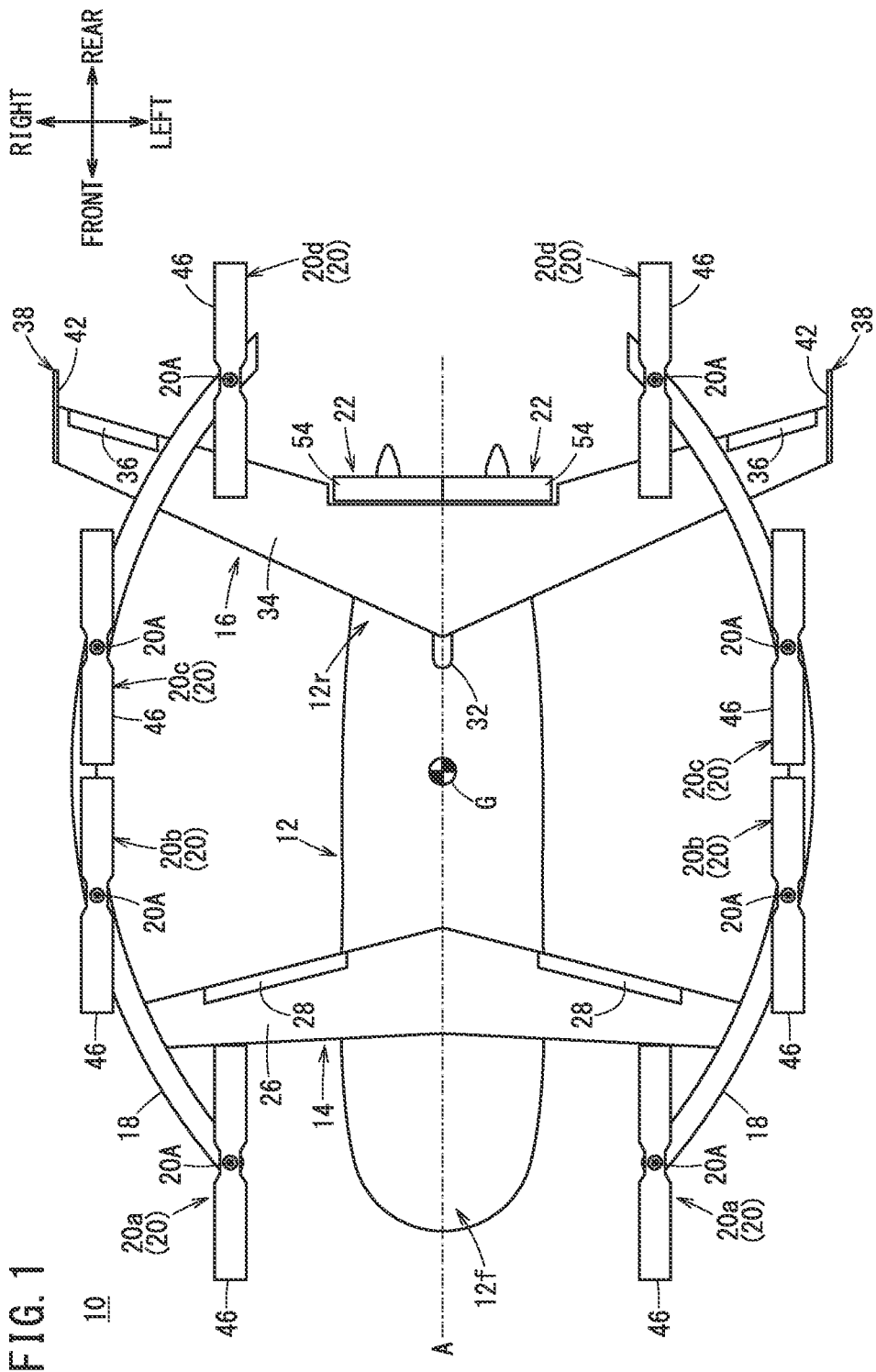
FIG. 1 is a plan view of an aircraft.

An overall configuration of an aircraft 10 will be described with reference to FIG. 1. In the present embodiment, an electric vertical take-off and landing aircraft is assumed as the aircraft 10. Electric vertical take-off and landing aircraft are referred to as eVTOL aircraft. The eVTOL aircraft generates lift and thrust by using rotors with electric motors as their drive sources. In this specification, a vertically upward direction is referred to as an upward direction. A vertically downward direction is referred to as a downward direction. Further, a moving direction of the aircraft 10 when the aircraft 10 moves (flies) in the horizontal direction is referred to as a forward direction. A direction opposite to the forward direction is referred to as a rearward direction. Further, when viewed from the aircraft 10 traveling forward, the right direction is defined as a right direction, and the left direction is defined as a left direction. Further, the plan view of the aircraft 10 refers to a state in which the aircraft 10 is viewed from above. The front view of the aircraft 10 refers to a state in which the aircraft 10 is viewed from the front.

The aircraft 10 includes a fuselage 12, a front wing 14, a rear wing 16, two booms 18, eight takeoff and landing rotors 20, and two cruise rotors 22. A central axis A of the fuselage 12 extends in the front-rear direction. In plan view, the central axis A overlaps with the center of gravity G of the aircraft 10.

The fuselage 12 is long in the front-rear direction. The fuselage 12 has a fuselage front portion 12f and a fuselage rear portion 12r. The fuselage front portion 12f is located in front of the center of gravity G. The fuselage rear portion 12r is located behind the center of gravity G. The fuselage front portion 12f becomes narrower toward the front end. The fuselage rear portion 12r becomes narrower toward the rear end. The fuselage 12 has a main body. The fuselage 12 may include the main body, and a fairing that covers a part of the main body. The main body and the fairing are referred to herein as the fuselage 12. A front portion of the fuselage 12 is referred to as the fuselage front portion 12f. A rear portion of the fuselage 12 is referred to as the fuselage rear portion 12r.

The front wing 14 is connected to an upper portion of the fuselage front portion 12f. The front wing 14 generates lift when the aircraft 10 moves forward. The front wing 14 includes a front wing main body 26, and left and right elevators 28. The front wing main body 26 extends to the left and right from the center of the fuselage 12. The front wing main body 26 is also referred to as a horizontal stabilizer. The left and right elevators 28 are disposed at the tailing edge of the front wing 14.

The rear wing 16 is connected to an upper portion of the fuselage rear portion 12r via a pylon 32. The rear wing 16 generates lift when the aircraft 10 moves forward. The rear wing 16 includes a rear wing main body 34, left and right elevons 36, and a pair of vertical tails 38. The rear wing main body 34 extends to the left and right from the center of the fuselage 12. Each elevon 36 is disposed at the tailing edge of the rear wing 16. The left vertical tail 38 is disposed at the left wing tip of the rear wing 16. The right vertical tail 38 is disposed at the right wing tip of the rear wing 16. Each vertical tail 38 includes a tail main body 42 and a rudder (not shown). The tail main body 42 is also referred to as a vertical stabilizer. The rudder is disposed at the tailing edge of the vertical tail 38.

The area of the rear wing 16 is larger than the area of the front wing 14. Further, the width of the rear wing 16 is longer than the width of the front wing 14. With such a configuration, the lift generated by the rear wing 16 when the aircraft 10 moves forward is greater than the lift generated by the front wing 14. That is, the rear wing 16 functions as a main wing of the aircraft 10. The rear wing 16 is a swept wing. On the other hand, the front wing 14 functions as a canard wing of the aircraft 10.

The lift generated by the rear wing 16 when the aircraft 10 moves forward and the lift generated by the front wing 14 when the aircraft 10 moves forward may be substantially the same. The ratio between the lift generated by the front wing 14 and the lift generated by the rear wing 16 is appropriately determined depending on the position of the center of gravity G, the attitude of the airframe during cruising, and the like. In addition, the size of the front wing 14 and the size of the rear wing 16 are determined in order to generate desired lift. In this specification, the size of the wing is a wing area, a length, or the like.

The two booms 18 include a right boom 18 and a left boom 18. The right boom 18 is disposed on the right side of the fuselage 12. The left boom 18 is disposed on the left side of the fuselage 12. The two booms 18 form a pair. The two booms 18 are arranged bilaterally symmetrically about a vertical plane including the central axis A. The two booms 18 are connected to the front wing 14 and the rear wing 16. The two booms 18 are connected to the fuselage 12 via the front wing 14 and the rear wing 16. The respective two booms 18 function as support members that support four takeoff and landing rotors 20.

The cross-sectional shape of the boom 18 taken along a plane orthogonal to the front-rear direction is an airfoil shape. The cross section of the boom 18 will be described in [2] below.

The right boom 18 is a bar member. The right boom 18 extends from the front toward the rear. The right boom 18 is curved in an arc shape toward the right side. The right boom 18 may be a straight bar member. The right boom 18 is connected to the right wing tip of the front wing 14. The right boom 18 is connected to the right wing of the rear wing 16. The right boom 18 is located on the left side of the right elevon 36. The front end of the right boom 18 is located in front of the front wing 14. The rear end of the right boom 18 is located behind the rear wing 16.

The left boom 18 is a bar member. The left boom 18 extends from the front toward the rear. The left boom 18 is curved in an arc shape toward the left side. The left boom 18 may be a straight bar member. The left boom 18 is connected to the left wing tip of the front wing 14. The left boom 18 is connected to the left wing of the rear wing 16. The left boom 18 is located on the right side of the left elevon 36. The front end of the left boom 18 is located in front of the front wing 14. The rear end of the left boom 18 is located behind the rear wing 16.

Each of the eight takeoff and landing rotors 20 includes a mast (not shown), a hub (not shown), and a plurality of blades 46. The mast is connected to an output shaft portion of an electric motor (not shown). The hub is connected to the mast. The plurality of blades 46 are connected to the hub. The mast is arranged in parallel with the vertical direction. The mast is rotatable about a rotation axis 20A extending in the vertical direction. The plurality of blades 46 are located above the booms 18, the front wing 14, and the rear wing 16. The pitch angle of the blades 46 is variable. With such a structure, the takeoff and landing rotors 20 rotate about the rotation axis 20A and generate lift. One rotor unit for generating lift has one takeoff and landing rotor 20, a rotation mechanism (electric motor or the like), and a drive circuit. Note that one rotor unit may include one or more batteries.

The eight takeoff and landing rotors 20 include four takeoff and landing rotors 20a to 20d on the right side, and four takeoff and landing rotors 20a to 20d on the left side. The right-side takeoff and landing rotors 20a to 20d are disposed on the right side of the fuselage 12. The left-side takeoff and landing rotors 20a to 20d are disposed on the left side of the fuselage 12. The right-side takeoff and landing rotors 20a to 20d are supported by the right boom 18. The left-side takeoff and landing rotors 20a to 20d are supported by the left boom 18. The right-side takeoff and landing rotor 20a and the left-side takeoff and landing rotor 20a form a pair. The position of the right-side takeoff and landing rotor 20a in the front-rear direction and the position of the left-side takeoff and landing rotor 20a in the front-rear direction are the same. The same applies to the left and right-side takeoff and landing rotors 20b to 20d.

As shown in FIG. 1, toward the rear, the pair of takeoff and landing rotors 20a, the front wing 14, the pair of takeoff and landing rotors 20b, the pair of takeoff and landing rotors 20c, the rear wing 16, and the pair of takeoff and landing rotors 20d are disposed in this order.

The two cruise rotors 22 each include a mast (not shown), a hub (not shown), and a plurality of blades (not shown). The mast is connected to the output shaft portion of the electric motor (not shown). The hub is connected to the mast. The plurality of blades are connected to the hub. A cylindrical duct 54 is provided around the cruise rotor 22. The mast is disposed below the rear wing 16. The mast is disposed parallel to the front-rear direction. The mast is rotatable about a rotation axis extending in the front-rear direction. With such a structure, the cruise rotors 22 rotate about the rotation axis extending in the front-rear direction and generate thrust. One rotor unit for generating thrust includes one cruise rotor 22, a rotation mechanism (such as the electric motor), and a drive circuit. Note that one rotor unit may include one or more batteries.

The two cruise rotors 22 are disposed on the fuselage rear portion 12*r*. The two cruise rotors 22 are located on the left side of the right-side takeoff and landing rotors 20*a* to 20*d* and on the right side of the left-side takeoff and landing rotors 20*a* to 20*d*. The two cruise rotors 22 are positioned between the pair of takeoff and landing rotors 20*c* and the pair of takeoff and landing rotors 20*d*. The rotation axes of the two cruise rotors 22 are located below the blades 46 of the eight takeoff and landing rotors 20.

The positions of the two cruise rotors 22 in the front-rear direction coincide with each other. The positions of the two cruise rotors 22 in the vertical direction also coincide with each other. Further, the two cruise rotors 22 are arranged side by side in the left-right direction. The right-side cruise rotor 22 is disposed to the right of the vertical plane including the central axis A of the fuselage 12. The right-side cruise rotor 22 is supported by the right wing of the rear wing 16. The left-side cruise rotor 22 is disposed to the left of the vertical plane including the central axis A of the fuselage 12. The left-side cruise rotor 22 is supported by the left wing of the rear wing 16.

[2. Cross Section of Boom 18]

[2.1. Relationship Between Boom 18 and Moving Direction of Blade 46]

Figure 2:
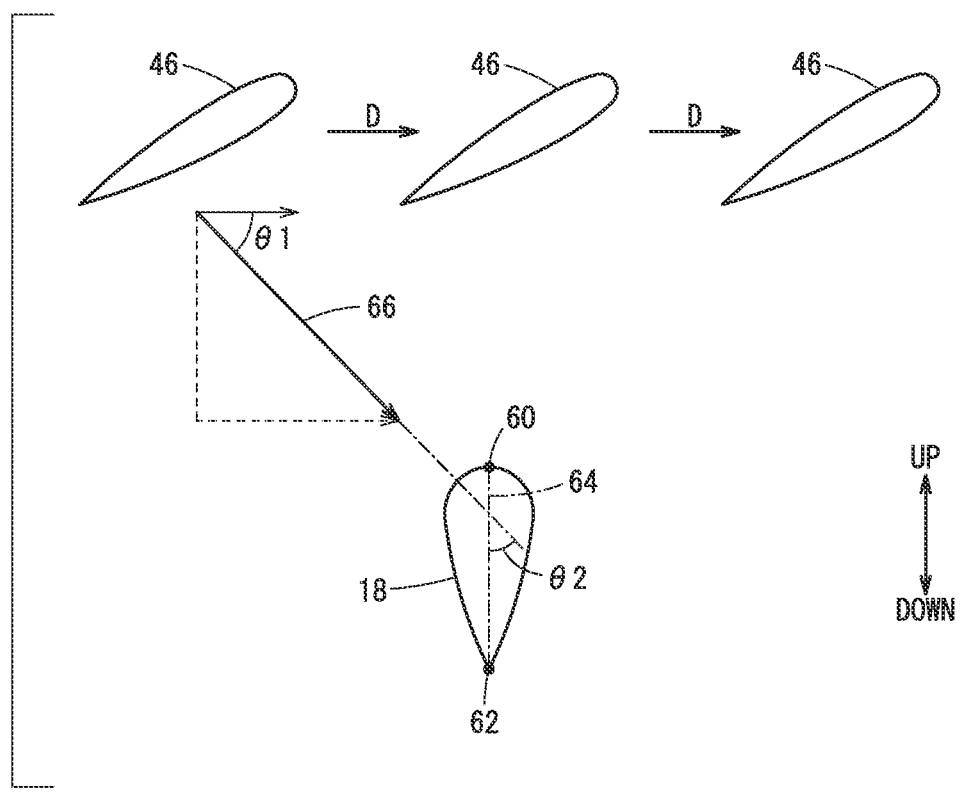
FIG. 2 is a diagram showing a direction in which a blade moves, a direction of airflow, and a direction in which a boom tapers.

FIG. 2 is a diagram showing a direction in which the blade 46 moves, a direction of airflow 66, and a direction in which the boom 18 tapers. The direction in which the blade 46 moves is referred to as a moving direction of the blade 46. In the cross section of the boom 18, the shape of a first end portion including a first end 60 is a curved shape. In the cross section of the boom 18, the shape of a second end portion including a second end 62 is a tapered shape. The cross-sectional shape of the boom 18 is an airfoil shape and also a teardrop shape. The first end 60 and the second end 62 of the cross section refer to intersections of a centerline 64 and an outline of the cross section. The first end 60 corresponds to the leading edge of the airfoil shape. The second end 62 corresponds to the trailing edge of the airfoil shape. The cross section of the boom 18 is symmetrical about the centerline 64. The boom 18 is disposed such that the direction in which the airfoil shape tapers is downward. The direction in which the boom 18 tapers corresponds to the direction in which the second end 62 is arranged relative to the first end 60 in the cross section of the boom 18. In the present embodiment, the tapering direction of the boom 18 is determined in advance according to the moving direction of the blade 46 passing directly above the boom 18.

During rotation of the takeoff and landing rotor 20, the blade 46 moves in the direction indicated by the arrow D in a position above the boom 18. The direction indicated by the arrow D is simply referred to as a lateral direction. When the blade 46 moves in the lateral direction, the airflow 66 is generated below the blade 46. The direction of the airflow 66 is inclined downward from the passing position of the blade 46 at an angle θ1 with respect to the moving direction of the blade 46. The airflow 66 impinging on the boom 18 is divided into left and right. When an angle θ2 of the centerline 64 of the boom 18 with respect to the direction of the airflow 66 is large to some extent, the pressure difference between the right side of the boom 18 and the left side of the boom 18 becomes large. Then, a force directed from the high-pressure side to the low-pressure side is generated, and a lateral force is generated on the boom 18. On the other hand, when the angle θ2 of the centerline 64 of the boom 18 with respect to the direction of the airflow 66 is small, the pressure difference between the right side of the boom 18 and the left side of the boom 18 becomes small. In this case, no lateral force is generated on the boom 18. Alternatively, only a very small force is generated on the boom 18.

Figure 3:
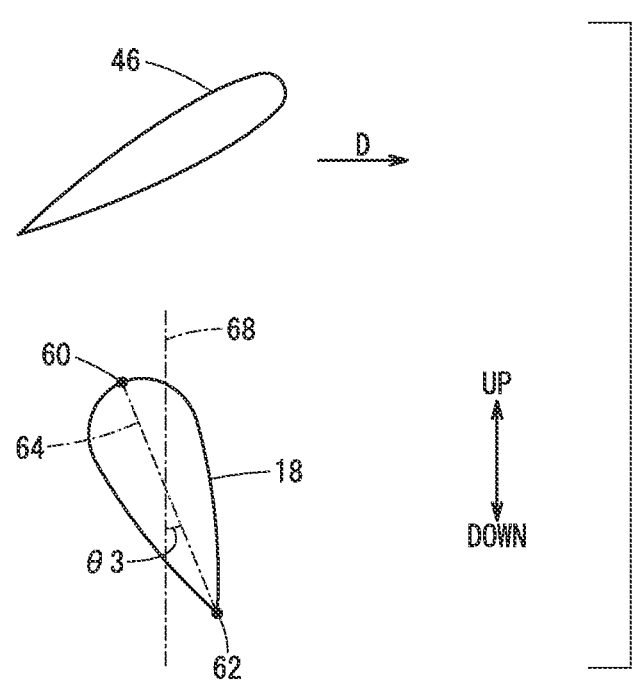
FIG. 3 is a diagram showing the direction in which the boom tapers.

As shown in FIG. 3, in the present embodiment, the tapering direction of the boom 18 is appropriately changed so that the pressure difference between the right side of the boom 18 and the left side of the boom 18 becomes small. Specifically, in a rotation range 70 (FIG. 4A) of the takeoff and landing rotor 20, the tapering direction of the boom 18 is inclined at an angle θ3 with respect to a parallel line 68. This means that the centerline 64 of the boom 18 is inclined at the angle θ3 with respect to the parallel line 68. The tapering direction of the boom 18 is inclined in the moving direction of the blade 46. The rotation range 70 is located directly below the blade 46. The parallel line 68 is parallel to the rotation axis 20A of the takeoff and landing rotor 20. At a plurality of positions between the front end of the boom 18 and the rear end of the boom 18, the tapering directions of the boom 18 are different. That is, the boom 18 is twisted.

The tapering direction of the right boom 18 will be described with reference to FIG. 4A and FIG. 4B. FIG. 4A is a diagram showing a plurality of positions (position P11 to position P16 and position P21 to position P27) between the front end of the right boom 18 and the rear end of the right boom 18. FIG. 4B is a diagram showing, at each position, the direction in which the blade 46 moves, the direction of the airflow 66, and the direction in which the boom 18 tapers. FIG. 4B shows a cross section of the blade 46 in a front view, the direction of the airflow 66 in a front view, and a cross section of the boom 18 in a front view. In the example shown in FIG. 4A, the rotation direction of the first takeoff and landing rotor 20*a* and the rotation direction of the fourth takeoff and landing rotor 20*d* are R1. In the example shown in FIG. 4A, the rotation direction of the second takeoff and landing rotor 20*b* and the rotation direction of the third takeoff and landing rotor 20*c* are R2. In plan view, the R1 is a clockwise direction. In plan view, the R2 is a counterclockwise direction.

Here, a direction in which the cross section of the boom 18 at the position P11 to the position P16 tapers and a direction in which the cross section of the boom 18 at the position P21 to the position P27 tapers will be described. The positions P11 to P16 and the positions P21 to P27 are arranged in the front-rear direction. The positions P11 to P16 and the positions P21 to P27 are defined as follows.

The position P11 is located behind the rotation axis 20A of the takeoff and landing rotor 20*a*, in a rotation range 70*a* of the takeoff and landing rotor 20*a*. The position P12 is located in front of the rotation axis 20A of the takeoff and landing rotor 20*b*, in a rotation range 70*b* of the takeoff and landing rotor 20*b*. The position P13 is located behind the rotation axis 20A of the takeoff and landing rotor 20*b*, in the rotation range 70*b* of the takeoff and landing rotor 20*b*. The position P14 is located in front of the rotation axis 20A of the takeoff and landing rotor 20*c*, in a rotation range 70*c* of the takeoff and landing rotor 20c. The position P15 is located behind the rotation axis 20A of the takeoff and landing rotor 20c, in the rotation range 70c of the takeoff and landing rotor 20c. The position P16 is located in front of the rotation axis 20A of the takeoff and landing rotor 20d, in a rotation range 70d of the takeoff and landing rotor 20d.

The position P21 is a position of the rotation axis 20A of the takeoff and landing rotor 20a. The position P22 is located between the rotation range 70a of the takeoff and landing rotor 20a and the rotation range 70b of the takeoff and landing rotor 20b. The position P23 is a position of the rotation axis 20A of the takeoff and landing rotor 20b. The position P24 is located between the rotation range 70b of the takeoff and landing rotor 20b and the rotation range 70c of the takeoff and landing rotor 20c. The position P25 is a position of the rotation axis 20A of the takeoff and landing rotor 20c. The position P26 is located between the rotation range 70c of the takeoff and landing rotor 20c and the rotation range 70d of the takeoff and landing rotor 20d. The position P27 is a position of the rotation axis 20A of the takeoff and landing rotor 20d.

At the positions P11, P12, and P14, the blade 46 moves above the boom 18 from right to left (in a direction approaching the fuselage 12). In this case, the direction of the airflow 66 generated below the blade 46 is the lower left direction. At the positions P11, P12, and P14, the tapering direction of the boom 18 is inclined to the left. As a result, the inclination angle of the tapering direction of the boom 18 with respect to the direction of the airflow 66 decreases. In other words, the centerline 64 of the boom 18 is inclined to the left. As a result, the angle θ2 of the centerline 64 with respect to the direction of the airflow 66 decreases. "Inclined to the left" means that the second end 62 is positioned to the left of the first end 60.

At the positions P13, P15, and P16, the blade 46 moves above the boom 18 from left to right (in a direction away from the fuselage 12). In this case, the direction of the airflow 66 generated below the blade 46 is the lower right direction. At the positions P13, P15, and P16, the tapering direction of the boom 18 is inclined to the right. As a result, the inclination angle of the tapering direction of the boom 18 with respect to the direction of the airflow 66 decreases. In other words, the centerline 64 of the boom 18 is inclined to the right. As a result, the angle θ2 of the centerline 64 with respect to the direction of the airflow 66 decreases. "Inclined to the right" means that the second end 62 is positioned to the right of the first end 60.

At the positions P21 and P27, there is no blade 46 passing above the boom 18. Therefore, at the positions P21 and P27, the boom 18 is not exposed to the strong airflow 66. Accordingly, at the positions P21 and P27, no large force in the lateral direction caused by the airflow 66 is generated on the boom 18.

At the positions P22 and P26, there is no blade 46 passing above the boom 18. At the positions P22 and P26, the tapering direction of the boom 18 is oriented in the same direction as the tapering direction of the boom 18 at positions adjacent to each of the positions P22 and P26. That is, at the positions P22 and P26, the centerline 64 of the boom 18 is inclined in the same direction as the centerline 64 of the boom 18 at the adjacent positions.

At the position P23, there is no blade 46 passing above the boom 18. Therefore, the boom 18 is not exposed to the strong airflow 66 at the position P23. Therefore, at the position P23, no large force in the lateral direction caused by the airflow 66 is generated on the boom 18. However, at the position P12 adjacent to the position P23, the tapering direction of the boom 18 is inclined to the left. Further, at the position P13 adjacent to the position P23, the tapering direction of the boom 18 is inclined to the right. That is, at the position P23, the inclination direction of the tapering direction is gradually changed from left to right as approaching from the position P12 to the position P13. For example, at the middle position between the positions P12 and P13, the tapering direction of the boom 18 is downward. That is, at the middle position between the positions P12 and P13, the centerline 64 of the boom 18 is parallel or slightly inclined with respect to the parallel line 68.

At the positions P24 and P25, there is no blade 46 passing above the boom 18. Similar to the position P23, at the positions P24 and P25, the tapering direction of the boom 18 gradually changes from right to left or from left to right as approaching from the front position to the rear position.

FIG. 5A is a diagram showing a plurality of positions (position P11 to position P16 and position P21 to position P27) between the front end of the left boom 18 and the rear end of the left boom 18. FIG. 5B is a diagram showing, at each position, the direction in which the blade 46 moves, the direction of the airflow 66, and the direction in which the boom 18 tapers.

In the present embodiment, the two takeoff and landing rotors 20 disposed at positions symmetrical to each other about the center of gravity G rotate in directions opposite to each other. For example, the rotation direction of the left-side takeoff and landing rotor 20a is R2. This is opposite to the rotation direction (R1) of the right-side takeoff and landing rotor 20d. The rotation direction of the left-side takeoff and landing rotor 20b is R1. This is opposite to the rotation direction (R2) of the right-side takeoff and landing rotor 20c. The rotation direction of the left-side takeoff and landing rotor 20c is R1. This is opposite to the rotation direction (R2) of the right-side takeoff and landing rotor 20b. The rotation direction of the left-side takeoff and landing rotor 20d is R2. This is opposite to the rotation direction (R1) of the right-side takeoff and landing rotor 20a. By rotating the respective takeoff and landing rotors 20 in this manner, it is possible to cancel the torque generated on the airframe.

In the present embodiment, the two takeoff and landing rotors 20 forming a pair on the left and right also rotate in directions opposite to each other. For this reason, the tapering direction of the boom 18 on the left side at each position (position P11 to position P16, position P21 to position P27) and the tapering direction of the boom 18 on the right side at the same position are opposite to each other.

As described above, the tapering direction of the boom 18 is inclined in the moving direction of the blade 46 passing directly above the boom 18 during rotation of the takeoff and landing rotor 20. In other words, the centerline 64 of the boom 18 is inclined, with respect to the parallel line 68, in the moving direction of the blade 46 passing directly above the boom 18 during rotation of the takeoff and landing rotor 20. With such a structure, it is possible to suppress the force generated on the boom 18 accompanying the rotation of the takeoff and landing rotor 20.

[2.2. Relationship Between Boom 18 and Blade 46]

Figure 6A:
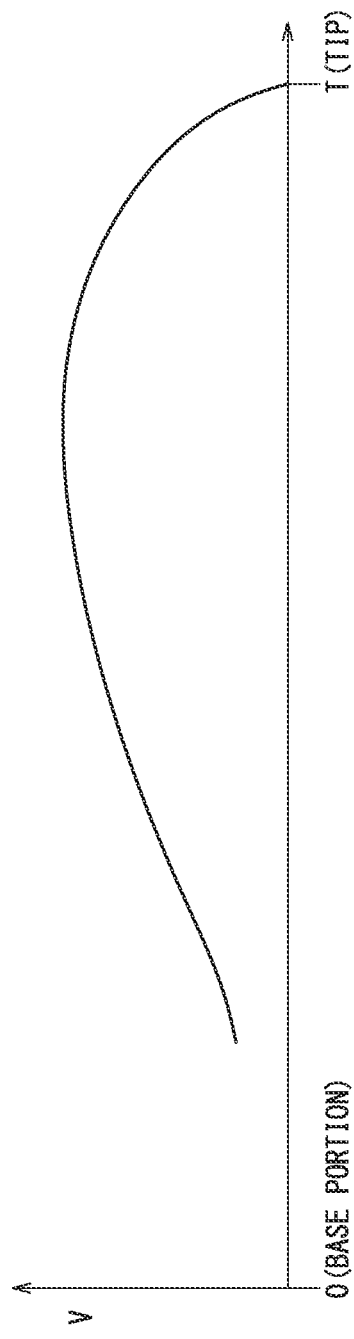
FIG. 6A is a diagram showing the speed of airflow generated directly below each portion of the blade from a base portion of the blade to a tip of the blade.
Figure 6B:
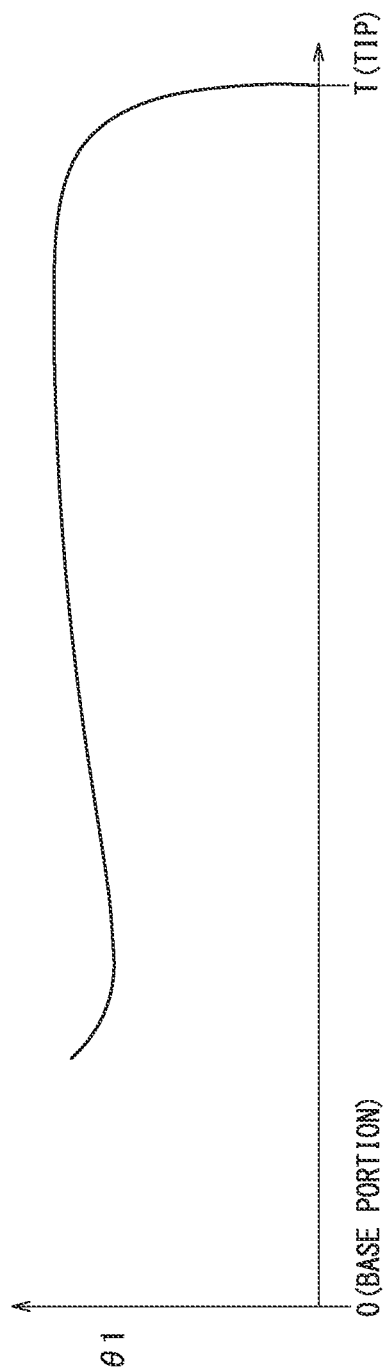
FIG. 6B is a diagram showing the angle of the airflow generated directly below each portion of the blade from the base portion of the blade to the tip of the blade.

FIG. 6A is a diagram showing a velocity V of the airflow 66 generated directly below each portion of the blade 46 from the base portion of the blade 46 to the tip of the blade 46. FIG. 6B is a diagram showing the angle θ1 of the airflow 66 generated directly below each portion of the blade 46 from the base portion of the blade 46 to the tip of the blade

46. In FIGS. 6A and 6B, the origin of the horizontal axis is the position of the base portion. In FIGS. 6A and 6B, T is the position of the tip.

As shown in FIG. 6B, the angle θ1 generally increases from the base portion side toward the tip side. Therefore, the portion of the boom 18 disposed in each rotation range 70 is formed such that the angle θ3 of the tapering direction with respect to the parallel line 68 becomes smaller from the base portion toward the tip of the blade 46. The angle θ3 is preferably about (90−θ1) degrees.

As shown in FIG. 6A, the velocity V of the airflow 66 on the tip side of the blade 46 is higher than the velocity V of the airflow 66 on the base portion side. Therefore, a greater effect can be obtained by adjusting the angle θ3 on the tip side.

[3. Technical Idea Obtained from Embodiment]

The technical idea that can be grasped from the above embodiment will be described below.

According to an aspect of the present invention, provided is an aircraft 10 comprising: a fuselage 12; a takeoff and landing rotor 20 including a blade 46 and configured to generate lift when the aircraft moves in a vertical direction; and a support member (boom 18) having a bar shape, connected to the fuselage 12 directly or via another member, and configured to support the takeoff and landing rotor 20 below the blade 46, wherein a cross-sectional shape of the support member is an airfoil shape in which a first end portion including a first end 60 is curved and which tapers toward a second end 62, the support member is disposed in a manner that a tapering direction of the airfoil shape is downward, and the tapering direction of the support member is determined in advance according to a moving direction of the blade 46 passing directly above the support member during rotation of the takeoff and landing rotor 20.

According to the above configuration, the tapering direction of the boom 18 is determined in advance according to the moving direction of the blade 46. Therefore, it is possible to suppress the force generated on the boom 18 accompanying the rotation of the takeoff and landing rotor 20.

In the aspect of the present invention, the tapering direction of the support member (boom 18) may be inclined in the moving direction of the blade 46 passing directly above the support member during the rotation of the takeoff and landing rotor 20.

According to the above configuration, since the tapering direction of the boom 18 is inclined in the moving direction of the blade 46, it is possible to suppress the force generated on the boom 18 accompanying the rotation of the takeoff and landing rotor 20.

In the aspect of the present invention, the tapering direction of the support member (boom 18) may be inclined with respect to a parallel line 68 that is parallel to a rotation axis 20A of the takeoff and landing rotor 20, and an inclination direction of the tapering direction of the support member with respect to the parallel line 68 may be determined according to the moving direction of the blade 46 passing directly above the support member during the rotation of the takeoff and landing rotor 20, and a distance from a base portion of the blade.

According to the above configuration, since the inclination direction of the tapering direction of the boom 18 with respect to the parallel line 68 is determined according to the moving direction of the blade 46 and the distance from the base portion of the blade 46, it is possible to suppress the force generated on the boom 18 accompanying the rotation of the takeoff and landing rotor 20.

In the aspect of the present invention, the support member (boom 18) may be formed in a manner that an angle θ3 of the inclination direction with respect to the parallel line decreases from the base portion of the blade 46 toward a tip thereof.

According to the above configuration, since the angle θ3 of the inclination direction with respect to the parallel line is appropriately changed below the blade 46, it is possible to more effectively suppress the force generated on the boom 18 accompanying the rotation of the takeoff and landing rotor 20.

In the aspect of the present invention, the support member (boom 18) may support at least two of the takeoff and landing rotors 20 that are arranged in a direction in which the support member extends, and that are disposed in a manner that rotation ranges 70 thereof are separated from each other, and the support member may be formed in a manner that, when the two takeoff and landing rotors 20 rotate in opposite directions, the inclination direction directly below a tip of the blade 46 of one of the takeoff and landing rotors 20, the inclination direction directly below a tip of the blade 46 of another of the takeoff and landing rotors 20, and the inclination direction between directly below the rotation range 70 of the one takeoff and landing rotor 20 and directly below the rotation range 70 of the another takeoff and landing rotor 20, are identical.

According to the above configuration, the portion of the boom 18 that is not disposed directly below the passing position of the blade 46 can be tapered in an appropriate direction.

In the aspect of the present invention, the support member (boom 18) may support at least two of the takeoff and landing rotors 20 that are arranged in a direction in which the support member extends, and that are disposed in a manner that rotation ranges 70 thereof are separated from each other, and the support member may be formed in a manner that, when the two takeoff and landing rotors 20 rotate in a same direction, the inclination direction between directly below the rotation range 70 of one of the takeoff and landing rotors 20 and directly below the rotation range 70 of another of the takeoff and landing rotors 20 gradually changes from the inclination direction directly below a tip of the blade 46 of the one takeoff and landing rotor 20 to the inclination direction directly below a tip of the blade of the another takeoff and landing rotor 20.

According to the above configuration, the portion of the boom 18 that is not disposed directly below the passing position of the blade 46 can be tapered in an appropriate direction.

In the aspect of the present invention, the support member (booms 18) may be disposed on each of a left side and a right side of the fuselage 12, and the support members disposed on the left side and the right side may support the takeoff and landing rotors 20 different from each other.

The aircraft according to the present invention is not limited to the above-described embodiment, and various configurations can be adopted therein without departing from the gist of the present invention.

What is claimed is:

1. An aircraft comprising:
   a fuselage;
   a takeoff and landing rotor including a blade and configured to generate lift when the aircraft moves in a vertical direction; and
   a support member having a bar shape and configured to support the takeoff and landing rotor below the blade, wherein a cross-sectional shape of the support member is an airfoil shape in which a first end portion including a first end is curved and which tapers toward a second end, the support member is disposed in a manner that a tapering direction of the airfoil shape is downward, and the tapering direction of the support member located directly below the blade is, with respect to a parallel line that is parallel to a rotation axis of the takeoff and landing rotor, defined by varying tapering angles inclined from the parallel line, that extend from the parallel line and that include tapering angles that are larger than 0°, during rotation of the blade of the takeoff and landing rotor rotating above the support member, wherein, along a length of the support member, the tapering direction transitions between the varying tapering angles.

2. The aircraft according to claim 1, wherein an inclination direction of the tapering direction of the support member with respect to the parallel line is determined according to a distance from a base portion of the blade.

3. The aircraft according to claim 2, wherein the support member is formed in a manner that the varying tapering angles of the tapering direction decrease from the base portion of the blade toward a tip thereof.

4. The aircraft according to claim 2, wherein the support member supports at least two of the takeoff and landing rotors that are arranged in a direction in which the support member extends, and that are disposed in a manner that rotation ranges thereof are separated from each other, and the support member is formed in a manner that the tapering direction directly below a tip of the blade of one of the takeoff and landing rotors, the tapering direction directly below a tip of the blade of another of the takeoff and landing rotors, and the tapering direction between directly below the rotation range of the one takeoff and landing rotor and directly below the rotation range of the another takeoff and landing rotor, are identical.

5. The aircraft according to claim 2, wherein the support member supports at least two of the takeoff and landing rotors that are arranged in a direction in which the support member extends, and that are disposed in a manner that rotation ranges thereof are separated from each other, and the support member is formed in a manner that, the tapering direction between directly below the rotation range of one of the takeoff and landing rotors and directly below the rotation range of another of the takeoff and landing rotors changes from the tapering direction directly below a tip of the blade of the one takeoff and landing rotor to the tapering direction directly below a tip of the blade of the another takeoff and landing rotor.

6. The aircraft according to claim 1, wherein the support member includes a plurality of support members, the takeoff and landing rotor includes a plurality of takeoff and landing rotors, a first support member of the plurality of support members is disposed on a left side of the fuselage, a second support member of the plurality of support members is disposed on a right side of the fuselage, the first support member supports a first rotor of the plurality of takeoff and landing rotors, and the second support member supports a second rotor of the plurality of takeoff and landing rotors.

7. The aircraft according to claim 1, wherein the tapering direction transitions along the length of the support member between tapering angles, of the varying tapering angles, including the tapering angles that are larger than 0°, and also including other tapering angles that are smaller than 0°.

* * * * *